United States Patent
Nihei

[19]

[11] Patent Number: 5,819,253
[45] Date of Patent: Oct. 6, 1998

[54] DATABASE RETRIEVAL SYSTEM HAVING A PLURALITY OF INDEPENDENT INPUT MODES FOR DATABASE RETRIEVAL CONDITIONS

[75] Inventor: Katsumi Nihei, Tokyo, Japan

[73] Assignee: NEC Corporation, Tokyo, Japan

[21] Appl. No.: 498,778

[22] Filed: Jul. 5, 1995

[30] Foreign Application Priority Data

Jul. 5, 1994 [JP] Japan ................................. 6-153198

[51] Int. Cl.⁶ ............................................. G06F 17/30
[52] U.S. Cl. ..................... 707/2; 707/1; 707/5; 707/7; 707/531; 364/962; 364/962.3; 364/963; 364/963.1; 364/963.3; 364/974; 364/974.4; 364/DIG. 2
[58] Field of Search ........................ 395/600, 601; 707/5, 1, 7, 531; 364/962, 962.3, 963, 963.1, 963.3, 974, 974.4, DIG. 4, DIG. 2

[56] References Cited

U.S. PATENT DOCUMENTS

| | | | |
|---|---|---|---|
| 4,332,014 | 5/1982 | Nakazawa et al. | 364/900 |
| 5,088,052 | 2/1992 | Spielman et al. | 395/158 |
| 5,140,692 | 8/1992 | Morita | 395/600 |
| 5,265,076 | 11/1993 | Ohyama | 369/28 |
| 5,278,980 | 1/1994 | Pedersen et al. | 707/2 |
| 5,297,042 | 3/1994 | Morita | 364/419.19 |
| 5,307,266 | 4/1994 | Hayasaki et al. | 364/419.07 |
| 5,347,623 | 9/1994 | Takano et al. | 395/157 |
| 5,398,338 | 3/1995 | Yoshida | 395/600 |
| 5,418,946 | 5/1995 | Mori | 392/600 |
| 5,497,489 | 3/1996 | Menne | 395/600 |
| 5,535,382 | 7/1996 | Ogawa | 395/600 |
| 5,592,663 | 1/1997 | Nagamori | 395/605 |

OTHER PUBLICATIONS

Oracle SQL *Plus, NEC Corporation, pp. 1–1–3–1.
Microsoft Access User's Guide, Microsoft, pp. 217–245.
Arita et al., Multi–modal Natural Language Interface MM–Simpla, NEC Corporation, 1993, pp. 585–589.
Uemura, Basics of Database System, Ohmsha, Ltd., pp. 92–167.

*Primary Examiner*—Thomas G. Black
*Assistant Examiner*—Jean H. Corriélus
*Attorney, Agent, or Firm*—Foley & Lardner

[57] ABSTRACT

A database retrieval system includes a retrieval condition input unit for inputting database retrieval conditions in a plurality of retrieval modes different from each other, an integration condition acceptance unit for inputting integration conditions for combining a plurality of database retrieval conditions input through the retrieval condition input unit, an integrated retrieval condition generation unit for integrating retrieval conditions input by the retrieval condition input unit according to integration conditions input by the integration condition acceptance unit, and a retrieval execution unit for retrieving a database according to retrieval conditions integrated by the integrated retrieval condition generation unit.

16 Claims, 4 Drawing Sheets

DATABASE RETRIEVAL SYSTEM HAVING A PLURALITY OF INDEPENDENT INPUT MODES FOR DATABASE RETRIEVAL CONDITIONS

BACKGROUND OF THE INVENTION

1. Field of the Invention

The present invention relates to database retrieval systems for retrieving a database by entering predetermined database retrieval conditions and, more particularly, a database retrieval system having a plurality of independent input modes for database retrieval conditions.

2. Description of the Related Art

Database retrieval systems, to which database retrieval conditions are input according to, e.g., the kinds of data managed by a database, a user's purpose, and the like, prepare various retrieval modes such as SQL (Structure Query Language), menus and natural language interfaces. To better meet the convenience of users and enable arbitrary input of such various retrieval conditions, there are provided database retrieval systems which have retrieval condition input means for a plurality of independent retrieval modes.

In a conventional database retrieval system having a plurality of retrieval condition input means of this kind, one kind of retrieval mode is selected among a plurality of retrieval modes prepared and a retrieval condition corresponding to the retrieval mode is input to conduct the retrieval of a database. However, such a database retrieval system fails to retrieve a database by multiply inputting a plurality of retrieval conditions for several retrieval modes because the respective retrieval condition input means are independent from each other.

A retrieval condition input means for a retrieval mode using SQL is disclosed in, for example, the reference literature *ORACLE SQL*Plus User's Guide, NEC Corporation*. The literature recites a means which stores data in a database by using SQL and retrieves the database. One example of database management systems which have retrieval condition input means for a plurality of independent retrieval modes is the application program disclosed in, for example, the reference literature *Microsoft ACCESS (Relational Database Management System for Windows) User's Guide, Microsoft*. The application program recited in the literature prepares a plurality of retrieval condition input means corresponding to different retrieval modes. Retrieval conditions input by the respective retrieval condition input means are independent from each other. Each retrieval condition input means generates a database retrieval expression and executes a retrieval to obtain retrieval results.

The above-described conventional database retrieval systems, however, have a disadvantage in that they would take time to obtain target retrieval results. This is because even with a plurality of retrieval condition input means for different retrieval modes, retrieval is conducted on a basis of retrieval condition input means. With a database retrieval system comprising retrieval condition input means for inputting SQL as retrieval conditions and retrieval condition input means having natural language interfaces, for example, there are cases that occur in which a user's purpose cannot be reflected in a simple manner by using SQL only or the natural language interface only. In such an event, it is conventionally a common practice to first conduct retrieval with a retrieval condition set in one of the retrieval modes and then, with respect to the first retrieval result produced, a retrieval condition is set in the other retrieval mode to obtain a desired retrieval result. These necessary steps make the procedure complicated.

SUMMARY OF THE INVENTION

An object of the present invention is to provide a database retrieval system having a plurality of independent retrieval condition input means which can flexibly and easily obtain target retrieval results by combining a plurality of retrieval conditional expressions according to user's designation to generate an integrated retrieval conditional expression for the retrieval of a database.

Further objects, features and effects of the present invention will become more apparent from the following detailed description of the present invention.

According to one aspect of the invention, a database retrieval system comprising:
  retrieval condition input means for inputting database retrieval conditions in a plurality of retrieval modes different from each other;
  integration condition input means for inputting integration conditions for combining a plurality of database retrieval conditions input through said retrieval condition input means;
  retrieval condition integrating means for integrating retrieval conditions input by said retrieval condition input means according to integration conditions input by said integration condition input means; and
  retrieval execution means for executing retrieval of a database according to the retrieval conditions integrated by said retrieval condition integrating means.

In the preferred construction, the retrieval condition input means generates a retrieval conditional expression based upon input retrieval conditions; and
  said retrieval condition integrating means combines retrieval conditional expressions generated by said retrieval condition input means according to integration conditions input by said integration condition input means to generate an integrated retrieval conditional expression.

Also, the retrieval condition input means comprises a plurality of independent input units for inputting retrieval conditions corresponding to the plurality of retrieval modes.

In the preferred construction, the integration conditions input by said integration condition input means include a condition for designating whether retrieval in a predetermined retrieval mode is to be executed or not and a logical operator indicative of a combination relationship among retrieval conditional expressions in a designated retrieval mode to be executed.

In the preferred construction, the said retrieval condition integrating means,
  referring to said designation condition of a retrieval mode among integration conditions input by said integration condition input means, inputs a retrieval conditional expression in a designated retrieval mode to be executed from said retrieval condition input means and stores the retrieval conditional expression;
  inputs and stores said logical operator out of integration conditions input by said integration condition input means; and
  after inputting all retrieval conditional expressions designated based on integration conditions, combines the stored retrieval conditional expression and the logical operator to generate an integrated retrieval conditional expression.

According to another aspect of the invention, a retrieval condition integrating device in a database retrieval system comprising:

integration condition input means for inputting integration conditions for combining retrieval conditions in a plurality of retrieval modes; and retrieval condition integrating means for integrating retrieval conditions input by a retrieval condition input means of said database retrieval system according to integration conditions input by said integration condition input means.

In the preferred construction, the said retrieval condition integrating means inputs retrieval conditional expressions generated in the plurality of retrieval modes and combines the retrieval conditional expressions according to integration conditions input by said integration condition input means to generate an integrated retrieval conditional expression.

Also, the integration conditions input by said integration condition input means include a condition for designating whether retrieval in a predetermined retrieval mode is to be executed or not and a logical operator indicative of a combination relationship among retrieval conditional expressions in a designated retrieval mode to be executed.

In the preferred construction, the said retrieval condition integrating means referring to said designation condition of a retrieval mode among integration conditions input by said integration condition input means, inputs a retrieval conditional expression in a designated retrieval mode to be executed from said retrieval condition input means and stores the retrieval conditional expression;

inputs and stores said logical operator out of integration conditions input by said integration condition input means; and after inputting all retrieval conditional expressions designated based on integration conditions, combines stored retrieval conditional expression and logical operator to generate an integrated retrieval conditional expression.

According to a further aspect of the invention, a database retrieval method comprising the steps of:

inputting database retrieval conditions in a plurality of retrieval modes different from each other;

inputting integration conditions for combining a plurality of database retrieval conditions input through said retrieval condition input step;

integrating retrieval conditions input by said retrieval condition input means according to integration conditions input by said integration condition input step; and retrieving a database according to retrieval conditions integrated by said retrieval condition integrating step.

In this case, the step of inputting integration conditions comprises the steps of:

designating whether retrieval in a predetermined retrieval mode is to be executed or not; and setting a logical operator indicative of a combination relationship among retrieval conditional expressions in a designated retrieval mode to be executed.

In the above-mentioned construction, the step of integrating retrieval conditions comprises the steps of:

with reference to said designation condition of a retrieval mode among integration conditions input in said step of inputting integration conditions, inputting and storing a retrieval conditional expression in a designated retrieval mode to be executed;

inputting and storing said logical operator out of said integration conditions; and after inputting all retrieval conditional expressions designated based on integration conditions, combining stored retrieval conditional expression and logical operator to generate an integrated retrieval conditional expression.

Other objects, features and advantages of the present invention can be recognized from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken as to limit the invention, but are for explanation and understanding only.

In the drawings.

DESCRIPTION OF THE PREFERRED EMBODIMENT

A preferred embodiment of the present invention will be described in detail in the following description with reference to the accompanying drawings.

Figure 1:
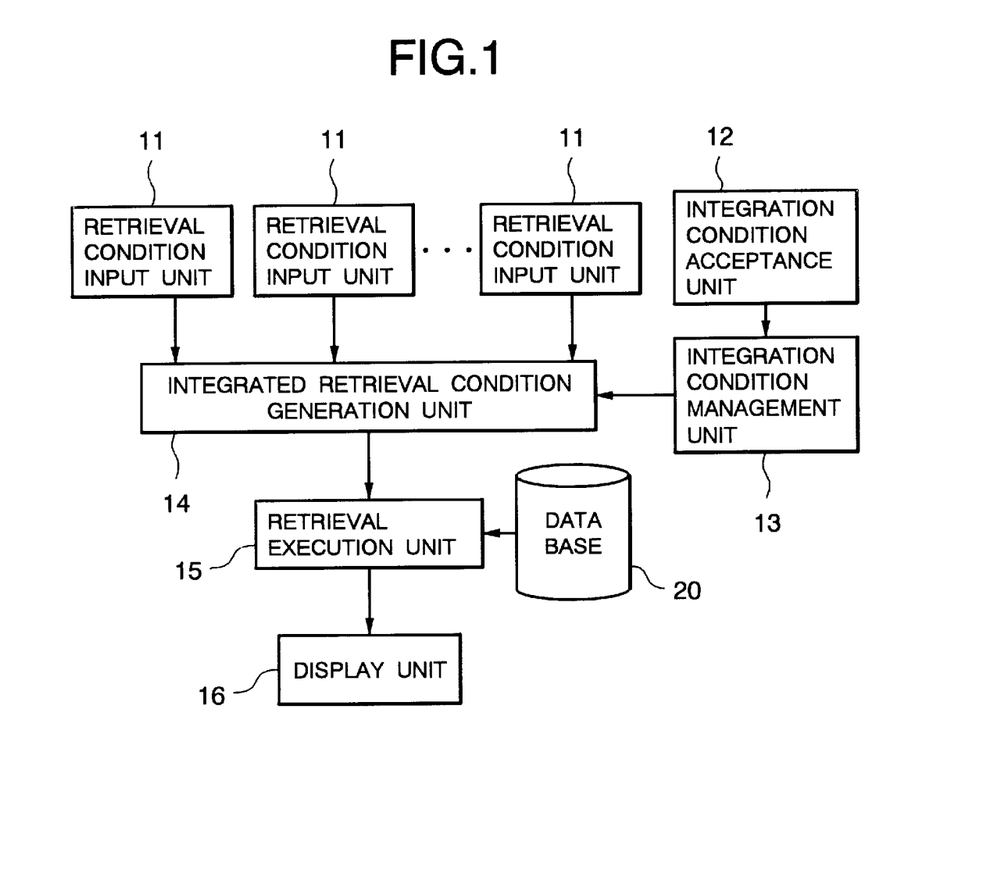
FIG. 1 is a block diagram showing an arrangement of a database retrieval system according to a first embodiment of the present invention.

FIG. 1 is a block diagram showing an arrangement of a database retrieval system according to a first embodiment of the present invention.

As shown in FIG. 1, the database retrieval system of the present embodiment includes a plurality of retrieval condition input units 11 for generating retrieval expressions by inputting retrieval conditions in various kinds of retrieval modes, an integration condition acceptance unit 12 for accepting input of an integration condition for combining retrieval conditions input through the respective retrieval condition input units 11, an integration condition management unit 13 for managing integration conditions for retrieval conditions accepted by the integration condition acceptance unit 12, an integrated retrieval condition generation unit 14 for generating an integrated retrieval expression under the control of the integration condition management unit 13 by combining retrieval conditions input through the retrieval condition input units 11, a retrieval execution unit 15 for executing retrieval of a database 20 according to a generated integrated retrieval conditional expression and a display unit 16 for indicating retrieval results.

Figure 2:
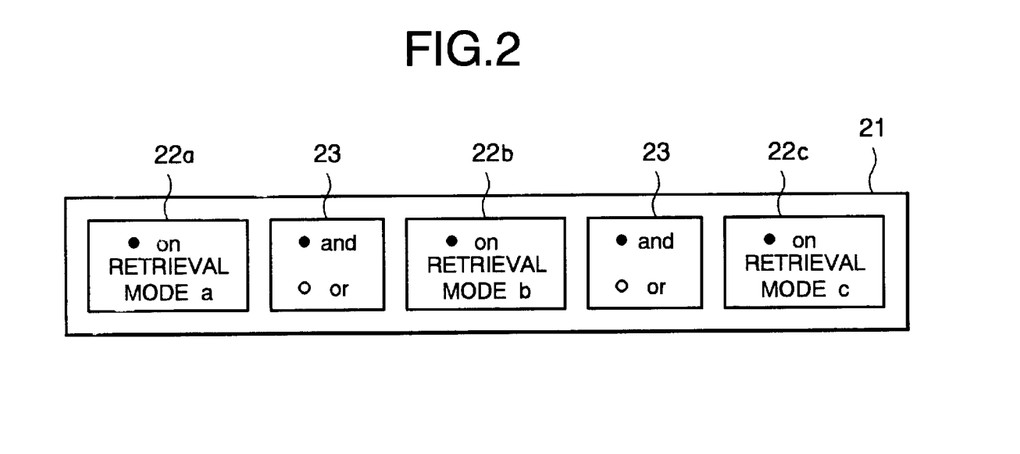
FIG. 2 is a diagram showing an example of an interface panel on an integration condition acceptance unit of the present embodiment.

The retrieval condition input unit 11, is implemented by program-controlled CPU and memory, or the like, of a personal computer or a workstation. The input unit 11 is connected to an input device such as a keyboard to generate a retrieval conditional expression based on retrieval conditions of a database input through the input device. In this example, the same number of retrieval condition input units 11 are provided to match the number of retrieval modes such as SQL, menus and natural language interfaces, as shown in FIGS. 1 and 2. The retrieval condition input units 11 are independent from each other and generate individual retrieval conditional expressions in response to each input. Generated retrieval conditional expressions are sent to the integrated retrieval condition generation unit 14. For inputting retrieval conditions and generating retrieval conditional expressions based on the input retrieval conditions conventional manners can be used, but no specific manner is proposed here. It is possible to employ, for example, the manner recited in the reference literature *ORACLE SQL\*Plus, User's Guide, NEC Corporation* as a method of using SQL for inputting retrieval conditions of a database. Also, the manner recited in the reference literature *Microsoft ACCESS User's Guide Microsoft* can be used as a method of using menus for inputting retrieval conditions. Further, the manner recited in the reference literature, by Arita, Nishimura and Shimazu, *Multi-modal Natural Language Interface MM-SIMPLA, NEC Corporation* (1993 Annual Conference of the Japanese Society for Artificial Intelligence) can be used as a method of using natural languages for inputting retrieval conditions.

The integration condition acceptance unit 12 is implemented by a program-controlled CPU and memory, or the like, of a personal computer or a work station. The acceptance unit 12 accepts input of integration conditions for combining retrieval conditional expressions in a plurality of retrieval modes. Input of integration conditions is carried out by using an input device such as a keyboard. FIG. 2 is a diagram showing one example of an interface panel on the integration condition acceptance unit 12 in a case where three retrieval condition input units 11 are provided. As illustrated in FIG. 2, an interface panel 21 through which integration conditions are entered includes retrieval mode selection designation units 22 for selecting a retrieval mode for inputting retrieval conditions and integration condition setting designation units 23 for setting integration conditions. The interface panel 21 may be implemented as a display screen of a display device which is operated by using a device such as a mouse, or a panel made of metal or the like, that may be provided with the designation units.

The FIG. 2 retrieval mode selection designation units 22 are provided corresponding to the FIG. 1 respective retrieval condition input units 11 to select, for use for retrieval, a retrieval mode of each retrieval condition input unit 11. In the example shown in FIG. 2, the unit 22 operates as a toggle button which indicates a black dot when the retrieval mode is to be used and a white dot when the retrieval mode is not to be used. The black dot and the white dot are alternately indicated by the selection of each retrieval mode selection designation unit 22.

The integration condition setting designation units 23 are used to set combinations of retrieval modes. A combination is obtained by designating either the logical product or the logical sum. In the example shown in the figure, a selected logical operation is denoted by a black dot. In FIG. 2, "RETRIEVAL MODE a" 22a, RETRIEVAL MODE b 22b, and RETRIEVAL MODE c 22c are each designated, respectively, on the three retrieval mode selection designation units 22 depicted in this example. In this example of three retrieval modes, all are used for the retrieval and the respective retrieval modes are combined by the logical product. When a user sets the above-described combination of retrieval modes by using the interface panel 21, the integration condition acceptance unit 12 sends the set combination of integration conditions to the integration condition management unit 13.

The integration condition management unit 13 is implemented by a program-controlled CPU and memory, or the like, of a personal computer or a work station. The management unit 13 stores integration conditions received from the integration condition acceptance unit 12 to monitor modification or non-modification of integration conditions. When integration conditions are input or modified, the unit 13 notifies the integrated retrieval condition generation unit 14.

Figure 3:
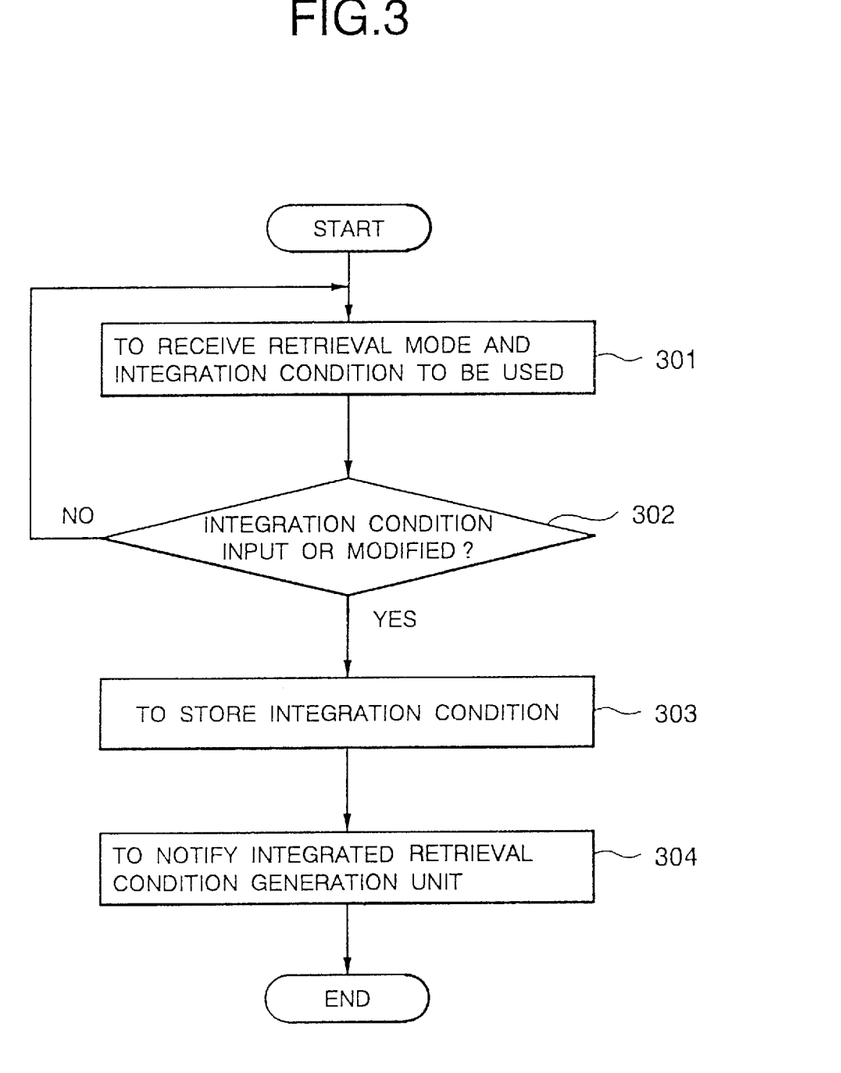
FIG. 3 is a flow chart showing operation of an integration condition management unit of the present embodiment.

FIG. 3 shows the flow of the processing operation conducted by the integration condition management unit 13. With reference to FIG. 1 and FIG. 3, the integration condition management unit 13 first receives a retrieval condition from the integration condition acceptance unit 12 (Step 301). Then, if there exists any integration condition held in the unit 13, the unit 13 compares it with the received integration condition to see if there is any modification in the integration contents. If no modification is found in the contents of the integration, the unit 13 again returns to the integration condition input wait state (Step 302). However, when the contents of the integration are modified, the unit 13 stores and holds the integration condition newly received from the integration condition acceptance unit 12 (Step 303). Then, the unit 13 notifies the integrated retrieval condition generation unit 14 of the modification of the integration condition to again return to the integration condition input wait state.

The integrated retrieval condition generation unit 14 is implemented by a program-controlled CPU and memory or the like, of a personal computer or a work station. When the generation unit 14 receives input of integration conditions or notification of the modification from the integration condition management unit 13, it integrates database retrieval conditional expressions generated by the respective retrieval condition input units 11 based upon integration conditions held by the integration condition management unit 13 to generate an integrated retrieval conditional expression. This procedure enables the generation of a retrieval conditional expression in which retrieval conditions are multiply combined according to a user's purpose.

Figure 4:
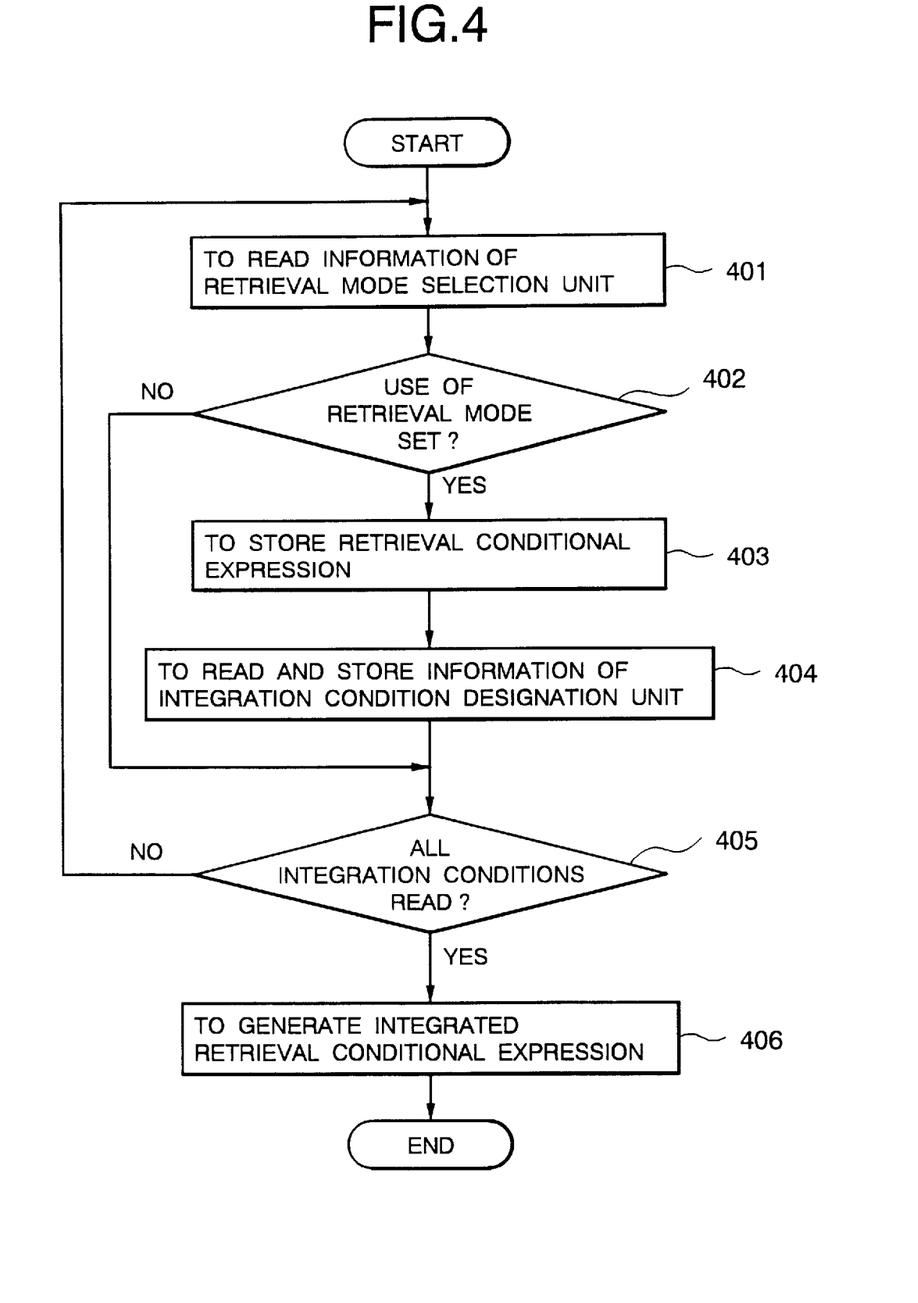
FIG. 4 is a flow chart showing operation of an integrated retrieval condition generation unit of the present embodiment.

FIG. 4 shows the flow of operation executed by the integrated retrieval condition generation unit 14 for generating integrated retrieval conditional expressions. In referring to FIG. 4 and FIG. 1, here, the integration condition acceptance unit 12 is assumed to receive input of integration conditions through the interface panel 21 shown in FIG. 2.

Referring to FIGS. 1, 2, and 4, first, the integrated retrieval condition generation unit 14 reads information corresponding to one of the retrieval mode selection designation units 22 among the integration conditions held by the integration condition management unit 13 (Step 401). Then, the unit 14 determines whether the retrieval mode corresponding to the unit 22 is to be used or not. When use of the retrieval mode is set, the unit 14 stores a retrieval conditional expression of the retrieval condition input unit 11 corresponding to the retrieval mode (Steps 402, 403). Then, the unit 14 reads information corresponding to one of the integration condition setting designation units 23 among the integration conditions held by the integration condition management unit 13 to store the condition corresponding to the unit 23 being the logical product or the logical sum (Step 404). However, when non-use of the retrieval mode is set at Step 402, the unit 14 stores neither a retrieval conditional expression nor an integration condition corresponding to the retrieval mode. The foregoing processing will be repeated until information corresponding to all the retrieval mode selection designation units 22 is read (Step 405). Thereafter, the unit 14 combines the stored retrieval conditional expressions based on the stored integration conditions to generate and output an integrated retrieval conditional expression (Step 406).

For example, when integration conditions are set as shown in FIG. 2, an integrated retrieval conditional expression is generated that is a retrieval conditional expression of the retrieval mode a, a retrieval conditional expression of the retrieval mode b, and a retrieval conditional expression of the retrieval mode c.

The retrieval execution unit 15, is implemented by program-controlled CPU and memory, or the like, of a personal computer or a work station. The execution unit 15 retrieves the database 20 according to an integrated retrieval conditional expression generated by the integrated retrieval condition generation unit 14 to output retrieval results. In the present invention conventional manners are applicable, but no specific manner of database retrieval is proposed here. For example, the method recited in the reference literature by Shunsuke Uemura, *Basics of Database System*, Ohmsha, Ltd., can be used.

The display unit 16 is implemented by a display device or the like. The display unit 16 displays retrieval results obtained by the retrieval execution unit 15. The unit 16 is also capable of accommodating the interface panel 21 of the integration condition acceptance unit 12 as described above.

With reference to the flow chart shown in FIG. 5, the flow of data retrieval processing according to the present embodiment will be described.

Figure 5:
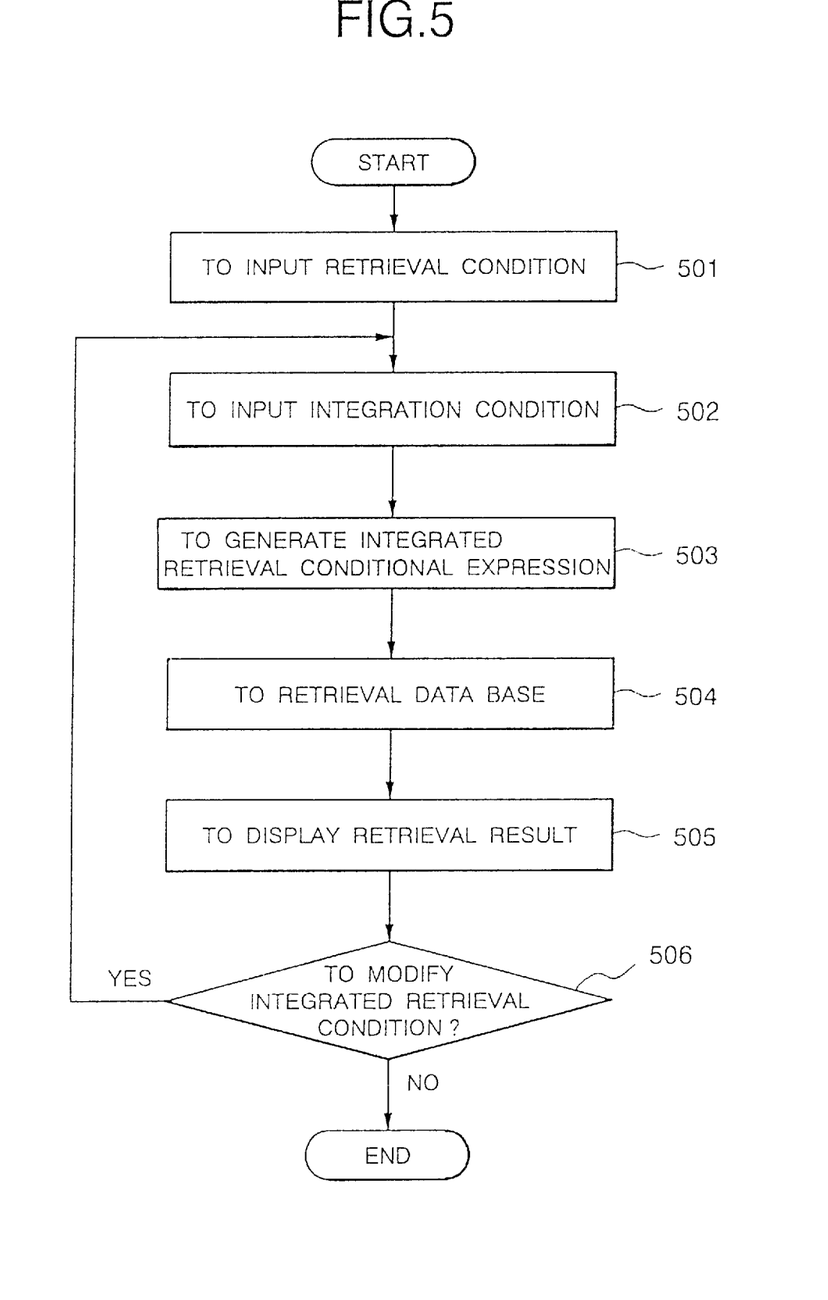
FIG. 5 is a flow chart showing operation of data retrieval processing according to the present embodiment.

Referring to FIGS. 1, 2, and 5, first, a user inputs a desired retrieval condition to the retrieval condition input unit 11 by using an input device such as a keyboard (Step 501). Then, the user inputs a desired integration condition to the integration condition acceptance unit 12 by means of the interface panel 21 or the like (Step 502). Upon input of these conditions, the integrated retrieval condition generation unit 14 receives input of a retrieval conditional expression from the retrieval condition input unit 11 and receives input of the integration condition from the integration condition management unit 13 to generate an integrated retrieval conditional expression (Step 503). Then, based on the generated integrated conditional expression, the retrieval execution unit 15 executes retrieval of the database 20 (Step 504) and the display unit 16 displays retrieval results obtained by the retrieval execution unit 15 (Step 505).

Referring to the retrieval results displayed on the display unit 16, the user is allowed to modify integration conditions when finding the retrieval results to be unsatisfactory (Step 506). If the retrieval results are unsatisfactory then it goes back to Step 502, and the user re-enters the integration conditions. When the integration conditions are re-entered, the integration condition management unit 13 detects modification of integration conditions so as to notify the integrated retrieval condition generation unit 14. The integrated retrieval condition generation unit 14 generates an integrated retrieval conditional expression based on the new integration conditions in response to the notification from the integration condition management unit 13 (Step 503). Then, the database 20 is retrieved (Step 504) and retrieval results are displayed (Step 505).

As described in the foregoing, since the database retrieval system of the present invention retrieves a database based on combined retrieval conditions in a plurality of different retrieval modes, entry of necessary retrieval conditions and their combinations enables the system to cope with the retrieval under multiple retrieval conditions, whereby time and labor necessary for the processing can be reduced.

In addition, referring to displayed retrieval results, a user is allowed to obtain retrieval results one after another based upon different integration conditions. It is therefore possible for the system of the present invention to execute flexible retrieval with ease according to a user's request.

Although the invention has been illustrated and described with respect to exemplary embodiment thereof, it is understood by those skilled in the art that the foregoing and various other changes, omissions and additions may be made therein and thereto, without departing from the spirit and scope of the present invention. Therefore, the present invention is not limited to the specific embodiment set out above, but is comprised of all possible embodiments which are within the scope, and equivalents thereof, with respect to the features set out in the appended claims.

What is claimed is:

1. A database retrieval system comprising:
    a plurality of independent retrieval condition input units, each input unit receiving an input of database retrieval conditions and operating in a unique one of a first arbitrary number of different retrieval modes, each input unit generating a retrieval conditional expression based on the input, the number of input units corresponding to the first arbitrary number of retrieval modes;
    integration condition input unit for inputting integration conditions for combining the retrieval conditional expressions generated by said independent retrieval condition input units;
    retrieval condition integrating unit for integrating a second arbitrary number of the retrieval conditional expression s generated by said independent retrieval condition input units according to the integration conditions, said retrieval condition integrating unit generating an integrated retrieval conditional expression; and
    retrieval execution unit for executing retrieval of a database according to the integrated retrieval conditional expression.

2. The database retrieval system as set forth in claim 1, wherein the integration conditions include a condition for designating whether or not retrieval in a predetermined retrieval mode is to be executed and a logical operator indicative of a combination relationship among the retrieval conditional expressions associated with the retrieval modes designated to be executed.

3. The database retrieval system as set forth in claim 2, wherein said retrieval condition integrating unit
    refers to the designated condition of the retrieval modes, receives the retrieval conditional expressions associated with the retrieval modes designated to be executed from said retrieval condition input units, and stores the retrieval conditional expressions;
    receives and stores said logical operator; and
    after receiving all retrieval conditional expressions associated with the retrieval modes designated to be executed, combines the stored retrieval conditional expressions using the logical operator to generate the integrated retrieval conditional expression.

4. The database retrieval system as set forth in claim 1, wherein the retrieval modes include at least one of SQL, a menu interface, and a natural language interface.

5. The database retrieval system as set forth in claim 1, further comprising:

integration condition management unit connected to receive the integration conditions from said integration condition input unit, and to notify said retrieval condition integrating unit when the integration conditions have been modified from previous integration conditions received from said integration condition input unit.

6. A retrieval condition integrating device in a database retrieval system comprising:

integration condition input unit for inputting integration conditions for combining a plurality of retrieval conditional expressions to generate an integrated retrieval conditional expression, each retrieval conditional expression being generated using a unique one of a first arbitrary number of different retrieval modes; and retrieval condition integrating unit for integrating a second arbitrary number of the retrieval conditional expressions according to the integration conditions.

7. The retrieval condition integrating device in a database retrieval system as set forth in claim 6, wherein the integration conditions include a condition for designating whether or not retrieval in a predetermined retrieval mode is to be executed and a logical operator indicative of a combination relationship among the retrieval conditional expressions associated with the retrieval modes designated to be executed.

8. The retrieval condition integrating device in a database retrieval system as set forth in claim 6, wherein said retrieval condition integrating unit refers to the designated condition of the retrieval modes, receives the retrieval conditional expressions associated with the retrieval modes designated to be executed, and stores the retrieval conditional expressions;

receives and stores said logical operator; and after receiving all retrieval conditional expressions associated with the retrieval modes designated to be executed, combines the stored retrieval conditional expressions using the logical operator to generate the integrated retrieval conditional expression.

9. The retrieval condition integrating device in a database retrieval system as set forth in claim 6, wherein the retrieval modes include at least one of SQL, a menu interface, and a natural language interface.

10. The retrieval condition integrating device in a database retrieval system as set forth in claim 6, further comprising:

integration condition management unit connected to receive the integration conditions from said integration condition input unit, and to notify said retrieval condition integrating unit when the integration conditions have been modified from previous integration conditions received from said integration condition input unit.

11. A database retrieval method comprising the steps of:
(a) in putting database retrieval conditions and generating retrieval conditional expressions based on the database retrieval conditions, each retrieval conditional expression being generated using a unique one of a first arbitrary number of different retrieval modes;
(b) inputting integration conditions for combining a second arbitrary number of the retrieval conditional expressions generated in said step (a);
(c) integrating the retrieval conditional expressions generated in said step (a) according to the integration conditions to generate an integrated retrieval conditional expression; and
(d) retrieving a database according to the integrated retrieval conditional expression.

12. The database retrieval method as set forth in claim 11, wherein said step (b) of inputting integration conditions comprises the steps of:

designating whether or not retrieval in a predetermined retrieval mode is to be executed; and setting a logical operator indicative of a combination relationship among the retrieval conditional expressions associated with the retrieval modes designated to be executed.

13. The database retrieval method as set forth in claim 12, wherein said step (c) of integrating retrieval conditions comprises the steps of:

with reference to the designated condition of a retrieval mode receiving and storing the retrieval conditional expressions associated with the retrieval modes designated to be executed;

receiving and storing said logical operator; and after receiving all retrieval conditional expressions associated with the retrieval modes designated to be executed, combining the stored retrieval conditional expressions using the logical operator to generate the integrated retrieval conditional expression.

14. The database retrieval method as set forth in claim 11, wherein the retrieval modes include at least one of SQL, a menu interface, and a natural language interface.

15. A database retrieval system comprising:

at least four independent retrieval condition input units, each input unit receiving an input of database retrieval conditions and operating in a unique retrieval mode, each input unit generating a retrieval conditional expression based on the input;

integration condition input unit for inputting integration conditions for combining the retrieval conditional expressions generated by said independent retrieval condition input units;

retrieval condition integrating unit for integrating the retrieval conditional expressions generated by said independent retrieval condition input units according to the integration conditions, said retrieval condition integrating unit being capable of integrating more than three retrieval conditional expressions, and said retrieval condition integrating unit generating an integrated retrieval conditional expression; and retrieval execution unit for executing retrieval of a database according to the integrated retrieval conditional expression.

16. A method of generating an integrated retrieval conditional expression comprising the steps of:
(a) providing an integration condition input unit having an arbitrary number of mode selection designation units corresponding to unique retrieval modes;
(b) inputting retrieval mode information into said mode selection designation units;
(c) inputting integration conditions corresponding to said retrieval mode information into said integration condition input unit;
(d) reading the retrieval mode information from one of said mode selection designation units into a retrieval condition integrating unit;
(e) determining whether the retrieval mode of said one of said mode selection designation units is to be used based on the retrieval mode information;

(f) if the retrieval mode is to be used, storing in said retrieval condition integrating unit a retrieval conditional expression corresponding to the retrieval mode, then reading the integration condition corresponding to said retrieval mode information from said integration condition input unit, and determining whether all integration conditions entered into said integration condition input unit have been read;

(g) if the retrieval mode is not to be used, determining whether all integration conditions entered into said integration condition input unit have been read;

(h) if all integration conditions entered into said integration condition input unit have been read, generating an integrated retrieval conditional expression based on the stored retrieval condition expressions and the stored integration conditions; and (i) if all integration conditions entered into said integration condition input unit have not been read, repeating steps (d)–(g).

* * * * *